United States Patent [19]

Gangi

[11] Patent Number: 4,935,280
[45] Date of Patent: Jun. 19, 1990

[54] HEAT BOND TAPE FOR CARPET SEAMING

[76] Inventor: Richard P. Gangi, 41 Jordan Dr., Riveredge, N.J. 07661

[21] Appl. No.: 276,620

[22] Filed: Nov. 28, 1988

[51] Int. Cl.⁵ .............................................. H05B 3/16
[52] U.S. Cl. ...................................... 428/102; 428/62; 428/212; 428/347; 428/156; 428/247
[58] Field of Search .................. 428/102, 212, 354, 62, 428/347, 156, 247

[56] References Cited

U.S. PATENT DOCUMENTS

| | | | |
|---|---|---|---|
| 1,917,430 | 7/1933 | Clark | 428/347 |
| 2,523,865 | 9/1950 | Dildilian | 428/62 |
| 2,524,456 | 10/1950 | Masland | 428/85 |
| 2,552,114 | 5/1951 | Reinhard | 428/200 |
| 2,692,842 | 10/1954 | Dildilian | 428/62 |
| 2,727,295 | 12/1955 | Wright | 428/347 |
| 2,850,404 | 9/1958 | Dunlap | 428/131 |
| 2,947,346 | 8/1960 | Thompson | 156/304.4 |
| 3,077,429 | 2/1963 | Carrigan | 156/304.4 |
| 3,400,038 | 9/1968 | Burgess | 428/347 |
| 3,485,704 | 12/1969 | Clymin | 428/347 |
| 3,533,876 | 10/1970 | Burgess | 156/304.4 |
| 3,549,471 | 12/1970 | Denton | 428/68 |
| 3,660,191 | 5/1972 | Shimota et al. | 156/152 |
| 3,661,669 | 5/1972 | Cairns | 156/157 |
| 3,711,349 | 1/1973 | Snyder et al. | 156/157 |
| 3,748,211 | 7/1973 | Hoopengardner | 156/575 |
| 3,755,058 | 8/1973 | Winkler | 156/209 |
| 3,969,564 | 7/1976 | Carder | 428/212 |
| 3,972,768 | 8/1976 | Hill | 156/304.4 |
| 4,132,582 | 1/1979 | Winkler | 156/295 |
| 4,416,713 | 11/1983 | Brooks | 428/62 |
| 4,483,896 | 11/1984 | Gray et al. | 428/200 |
| 4,522,863 | 6/1985 | Keck et al. | 428/196 |
| 4,525,233 | 6/1985 | Brooks | 156/304.4 |
| 4,536,244 | 8/1985 | Greci et al. | 156/304.4 |
| 4,565,728 | 1/1986 | Gray et al. | 428/200 |
| 4,584,040 | 4/1986 | Anderson | 156/152 |
| 4,610,906 | 9/1986 | Brooks | 428/102 |
| 4,613,396 | 9/1986 | Scarborough | 156/391 |
| 4,671,977 | 6/1987 | Berry | 428/62 |
| 4,699,686 | 10/1987 | Franke | 156/579 |
| 4,749,433 | 6/1988 | Johnston et al. | 456/304.4 |

Primary Examiner—Alexander S. Thomas
Attorney, Agent, or Firm—Harris, Kern, Wallen & Tinsley

[57] ABSTRACT

A heat bond tape for carpet seaming and a method for making the tape. A yarn tape is fixed to a porous carrier strip during the tape knitting by stitching the yarn filaments to the carrier strip. The resulting tape carrier is adhered to a non-porous backing strip by a thermoplastic material, which adhesive material may be melted to join the edges of two pieces of carpet to the heat bond tape in the conventional manner.

8 Claims, 1 Drawing Sheet

HEAT BOND TAPE FOR CARPET SEAMING

BACKGROUND OF THE INVENTION

This invention relates to carpet installations, and in particular to a new and improved heat bond tape for carpet seaming, and a method of manufacture of such tape.

Heat bond tapes have been in use for a considerable period of time, and the typical tape includes a backing strip, typically paper, a reinforcing webbing, typically a yarn, and a thermoplastic adhesive material The adhesive material is heated during the carpet seaming operation and adheres the webbing and backing strip to the back of the edges of the two pieces of carpet being joined.

The backing strip acts as a carrier for the adhesive and the reinforcing fiber or yarn and may be of paper, cloth, plastic, foil, or the like Desirably, the backing strip is made wide enough to prevent adhesive from being squeezed around its edges and sticking to the pad or floor or other material beneath. Also the backing strip is made relatively non-porous to prevent adhesive from flowing through it. Desirably, the backing strip is somewhat extensible in the longitudinal direction of the strip so that the backing strip will not tear when stretched during carpet installation.

Fibers of the reinforcing webbing are positioned transverse to the longitudinal axis of the backing strip and usually are made of fiberglass or other non-extensible yarn to provide lateral strength across the carpet seam. At the same time, the webbing desirably is extensible in the longitudinal direction so that it will not fracture when the heat bond tape is stretched.

In the past, the webbing has been provided in one of three varieties. In one arrangement, the webbing is knitted or woven as a yarn tape which is then glued to the backing strip. In another arrangement, the knitted yarn tape is stitched to the backing strip. This type of construction is shown in U.S Pat. No. 3,485,704. In the third variation, individual fibers are positioned transversely on the backing strip and are glued in place. There are disadvantages to each of these arrangements, and it is an object of the present invention to provide a new and improved heat bond tape which overcomes the disadvantages.

When a heat bond tape is installed, the adhesive material adheres to the back of the carpet edges and to the fiber used in the webbing. When the joined carpet is stretched, a tensile shear stress is produced at the seam and this stress is transferred through the adhesive to the webbing material. Both the adhesive material and the webbing must resist the tensile shear stress in order to maintain the integrity of the seam.

The thermoplastic adhesive material typically includes a polymer for strength and a tackifier for adhesion, along with filler materials and an anti-oxidant for improved aging.

In one arrangement, the webbing is positioned over the paper and the adhesive material in molten state is applied and formed with a flat surface or with parallel rows of beads, as desired. On cooling, the adhesive material holds the webbing and paper together. An advantage of this arrangement is that the adhesive material completely surrounds the fibers of the webbing resulting in a matrix which reduces the natural brittleness of the fibers and provides a flexible high strength reinforcement material. A disadvantage of this arrangement is that the fibers of the webbing can change position and orientation whenever the adhesive is in the molten state. This can occur during assembly when the transverse fibers can become skewed or bowed or other than perpendicular to the longitudinal axis of the tape. Also, when this form of heat bond tape is being used to join carpet edges with the adhesive material again molten, the fibers can become disoriented, and also can stick to the heating iron as it is removed from the tape. When the transverse fibers are not straight and perpendicular to the seam, the resistance of the heat bond tape to the tensile shear stress is substantially reduced, since the seam will separate while the bowed fibers are being straightened and the oblique fibers are being brought perpendicular by the tensile shear stress. This results in an increase of stress on fewer fibers, with fiber breakage and seam opening.

In an alternative construction, the webbing yarns are glued to the backing strip with a first adhesive, prior to applying the thermoplastic adhesive material. This gluing operation effectively fixes the webbing to the paper and substantially eliminates the movement of the yarn during manufacture and during application to the carpet. However since the fibers are fixed to the backing strip by an adhesive, the subsequently applied thermoplastic adhesive material is prevented from completely surrounding the fibers in the manner as previously described where the thermoplastic adhesive material is utilized for bonding the webbing to the backing strip. In this type of construction, the fibers are not completely surrounded by the adhesive material resulting in a tape that is less strong and more brittle than the previously described tape.

In a variation of such construction, individual fibers are glued directly to the backing strip, usually both in transverse and longitudinal directions. After this gluing operation, the thermoplastic material is applied in the conventional manner. This design eliminates the knitting operation for the webbing but does prevent the thermoplastic adhesive material from surrounding the fibers. In another variation, the webbing, typically a previously knitted or woven yarn tape, is glued directly onto the paper backing strip. After this gluing operation, the thermoplastic material is applied in the conventional manner.

In another arrangement, the webbing, typically a knitted yarn tape, is stitched directly onto the paper backing strip during the knitting operation. With this arrangement, the webbing is maintained in position during application of the thermoplastic material and during carpet seaming. However the holes in the backing strip resulting from the stitching operation permit flow of the molten adhesive through the backing strip. This is a problem during manufacture and also during installation with the heat bond tape becoming attached to the underlying pad or floor.

SUMMARY OF THE INVENTION

It is an object of the present invention to provide a new and improved heat bond tape for carpet seaming and a method for making such a tape. A further object is to provide such a tape in which the transverse fibers are disposed and maintained straight and perpendicular to the longitudinal axis of the tape, thereby eliminating or reducing open seams and seam breakage, with the fibers being positioned on and maintained in position on the backing strip during manufacture and during installation rather than having the fibers lifting from the backing strip or moving over the backing strip. An additional object is to provide such a heat bond tape wherein the thermoplastic adhesive material can entirely surround and mix with the fibers providing a tape which has improved strength and flexibility.

The presently preferred embodiment of the heat bond tape includes a yarn tape, a relatively porous carrier strip, a relatively non-porous backing strip, and a thermoplastic adhesive material. The yarn tape is stitched to the carrier strip, typically a fiber scrim, to form a tape carrier. The tape carrier is adhered to the backing strip by the thermoplastic adhesive material, with the adhesive material passing around the fibers of the yarn tape and through the carrier strip.

With this arrangement, the desired transverse straight position of the fibers is obtained and maintained during manufacture and installation, the non-porous nature of the backing strip is retained, only a single adhesive is needed, and the adhesive material is able to mix with the yarn fibers achieving the desired bonding.

DESCRIPTION OF THE PREFERRED EMBODIMENT

Figure 1:
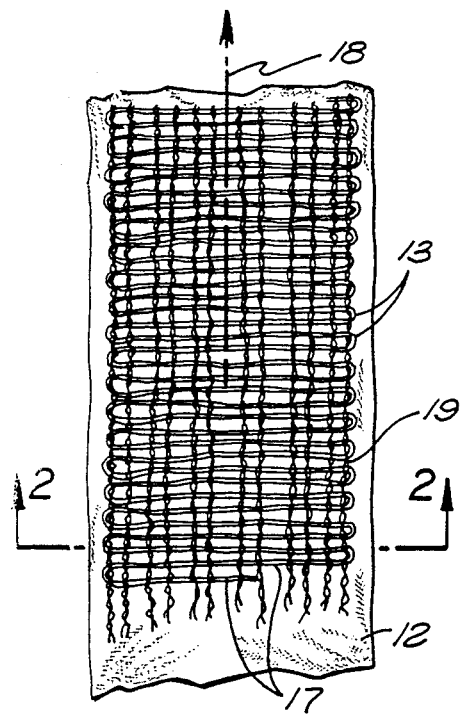
FIG. 1 is a top view of a tape carrier comprising a yarn tape and carrier strip incorporating the presently preferred embodiment of the invention.
Figure 3:
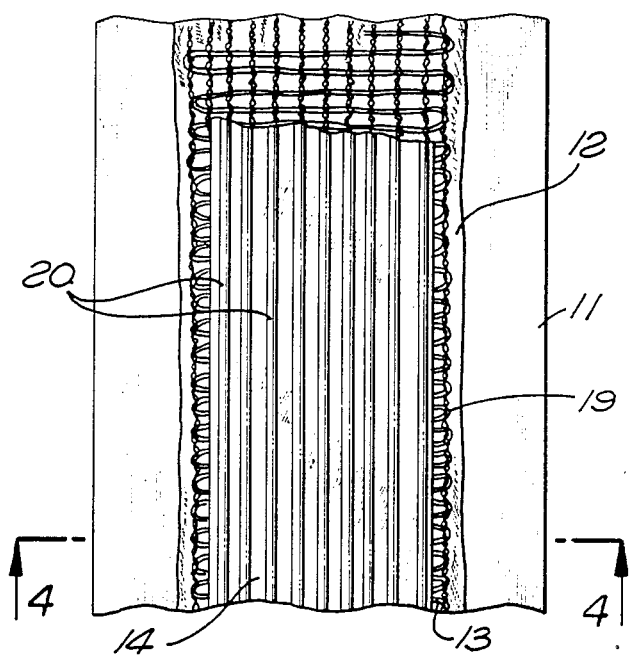
FIG. 3 is a top view of a heat bond tape with the carrier tape of FIG. 1 installed.
Figure 2:
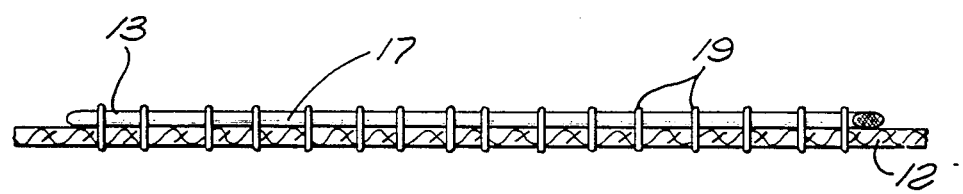
FIG. 2 is a sectional view taken along the line 2—2 of FIG. 1, with the vertical dimensions exaggerated.
Figure 4:
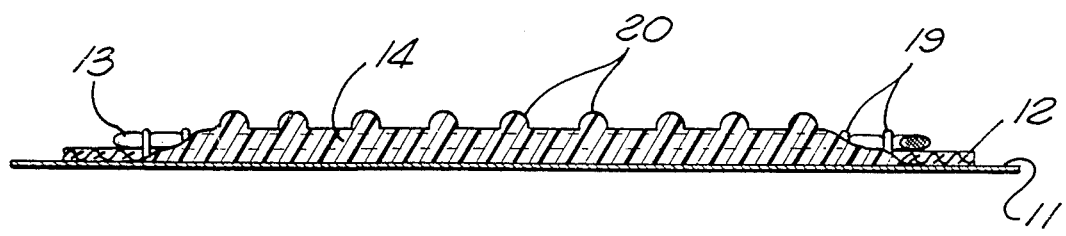
FIG. 4 is a sectional view taken along the line 4—4 of FIG. 3, with the vertical dimensions exaggerated.

The preferred embodiment of the heat bond tape as shown in the drawing figures includes a backing strip 11, a carrier strip 12, a yarn tape 13, and a thermoplastic adhesive material 14.

The yarn tape is conventional in construction, and may be that shown in U.S. Pat. Nos. 3,485,704 and 3,755,058. Typically the yarn tape is knitted of fiberglass fibers on a conventional knitting machine such as a crochet-warp knitter available from Cidega Manufacturing, Inc. The yarn tape includes transverse filaments 17 arranged in straight parallel rows perpendicular to the longitudinal axis 18 of the tape. Preferably the transverse filaments 17 are untwisted or soft twisted bundles of filaments forming yarns of high tensile strength and low extensibility and may be made of fiberglass or synthetic fibers or natural fibers or metal wire. The knitted yarn tape includes warp chains 19, typically of a twisted cotton yarn or other material of lesser tensile strength.

The carrier strip 12 is formed of a relatively porous material which can be thin, lightweight and of relatively low strength, since this carrier strip is not designed as a stress carrying member of the finished carpet seam. The carrier strip may be paper, cloth, plastic, foil, or the like and typically is a fiber scrim and may be woven, felted, perforated, ribboned or otherwise prepared to obtain the desired porosity.

In the heat bond tape of the invention, the carrier strip 12 is formed integral with the yarn tape 13. In the preferred embodiment, the carrier strip is attached to the yarn tape by feeding the carrier strip into the knitting machine and having the warp chains stitched to the carrier strip as well as joining the transverse filaments. With this arrangement, the size, shape and alignment of the knitted yarn tape is maintained during the subsequent attachment to the backing strip and the later joining to the carpet backs.

The backing strip 11 typically is of paper, and may be the same as that used in prior heat bond tapes. This backing strip is made relatively non-porous so that the molten thermoplastic adhesive material will not flow through the backing strip. In contrast, the carrier strip is made relatively porous so that the molten thermoplastic adhesive material can flow through the carrier strip and flow around all the fibers of the yarn tape, penetrating the fibers and adhering the yarn tape to the backing strip. Alternatively the backing strip may be made of foil, plastic, fabric, or other material selected to be non-porous.

The carrier strip and yarn tape may be positioned on the backing strip with the carrier strip up or down. The preferred position is carrier strip down, as this insures that the adhesive completely surrounds the fibers of the yarn tape and then passes through the porous carrier strip to glue the tape to the backing strip.

The thermoplastic adhesive material 14 is a conventional material and may be any of those being used in the prior heat bond tapes. The adhesive material is applied in the conventional manner, with a flat surface or with a plurality of parallel beads 20, or otherwise as desired.

The heat bond tape of the present invention is now ready for use in joining two carpet edges, in the same manner as with prior heat bond tapes. With the tape and method of the invention, the transverse filaments of the yarn tape are positioned straight and perpendicular to the longitudinal axis of the tape while in the knitting machine, and are maintained in this position by the attachment to the carrier strip, during transfer from the knitting machine to the backing strip, during the step of adhering the combination yarn tape - carrier strip to the backing strip with the adhesive material, and during the adhering of the heat bond tape to the carpet backs. No second adhesive or bonding material or emulsion is needed. The integrity of the non-porous backing strip is not destroyed by any stitching or punching while at the same time the yarn tape is maintained on the backing with the transverse fibers straight. Also, the desired penetration and complete surrounding of the fibers of the yarn tape by the adhesive material is obtained.

The use of the straight transverse filaments 17 allows more uniform application of stress during carpet stretching with a direct transfer of perpendicular stress and avoids oblique stress, the need for straightening of bowed filaments, and seam gapping or opening. There is reduced breakage at the seam and higher seam strength.

Higher strength and increased seam flexibility is achieved by providing for complete surrounding of the fibers by the adhesive material.

Use of the carrier strip maintains the fibers in fixed position during tape installation while the iron is moved along the tape and subsequently removed. The scrim does not come off and stick to the iron, permitting the installer to work faster and produce a higher quality seam.

I claim:

1. A heat bond tape for carpet seaming, comprising in combination:
   a yarn tape;
   a relatively porous carrier strip;
   a relatively non-porous backing strip; and
   a thermoplastic adhesive material;

with said yarn tape attached to said carrier strip, and with said yarn tape and carrier strip adhered to said backing strip by said adhesive material.

2. A tape as defined in claim 1 with said adhesive material passing around the fibers of said yarn tape and through said carrier strip.

3. A tape as defined in claim 2 with said adhesive material having parallel rows of beads projecting upward above said yarn tape.

4. A tape as defined in claim 1 wherein said carrier strip is a material selected from the group consisting of cloth, paper, plastic and foil.

5. A tape as defined in claim 1 wherein said yarn tape is formed of a material selected from the group consisting of natural fiber, synthetic fiber, fiberglass, wire and combinations thereof.

6. A tape as defined in claim 1 wherein said carrier strip is a fiber scrim.

7. A tape as defined in claim 1 wherein said yarn tape is attached to said carrier strip by stitching.

8. A tape as defined in claim 1 wherein said backing strip is formed of a material selected from the group consisting of paper, foil, plastic and fabric.

* * * * *